United States Patent [19]
Nielinger et al.

[11] 3,839,286
[45] Oct. 1, 1974

[54] AROMATIC POLYAMIDES PREPARED FROM HALOGENATED DIAMINO DIPHENYLETHER

[75] Inventors: Werner Nielinger; Heinrich Haupt, both of Krefeld; Hans Rudolph, Krefeld-Bockum; Hugo Vernaleken, Krefeld; Gunter Blankenstein, Stommeln, all of Germany

[73] Assignee: Bayer Aktiengesellschaft, Leverkusen, Germany

[22] Filed: Aug. 2, 1973

[21] Appl. No.: 384,902

[30] Foreign Application Priority Data
Aug. 2, 1972 Germany............................ 2237958

[52] U.S. Cl. ........ 260/47 CZ, 117/161 P, 260/30.2, 260/32.6 N, 260/DIG. 24

[51] Int. Cl. ............................................ C08g 20/20
[58] Field of Search............................... 260/47 CZ

[56] References Cited
UNITED STATES PATENTS

| | | | |
|---|---|---|---|
| 3,349,062 | 10/1967 | Hill et al. ............... | 260/47 |
| 3,354,127 | 11/1967 | Hill et al. ............... | 260/78 |
| 3,705,870 | 12/1972 | Darmory et al. ......... | 260/30.2 R |
| 3,738,964 | 6/1973 | Dobinson et al. ........ | 260/47 |

*Primary Examiner*—Lester L. Lee
*Attorney, Agent, or Firm*—Plumley & Tyner

[57] ABSTRACT

Self-extinguishing aromatic polyamides obtained by polycondensation of halogenated 2,4-diaminodiphenylethers and isophthalic acid and optionally terephthalic acid.

7 Claims, No Drawings

AROMATIC POLYAMIDES PREPARED FROM HALOGENATED DIAMINO DIPHENYLETHER

This invention relates to flame-resistant, self-extinguishing aromatic polyamides and to a process for their production by the polycondensation of aromatic dicrboxylic acid dihalides and halogenated 2,4-diaminodiphenyl ethers in solution.

Aromatic polyamides prepared from substituted or unsubstituted diamines and dicarboxylic acids have been disclosed, for example, in U.S. Pat. No. 3,094,511. In this patent, condensates of isophthalic acid chloride and, for example, substituted m-phenylenediamines or substituted bis-aminophenyl ethers or alkanes are described to be particularly useful products for the production of fibres. Since, however, these products are only sufficiently soluble if salts are added, they are very difficult to process into shaped products such as films or fibres because the salt added must subsequently be extracted from the shaped products.

Attempts have been made to overcome this difficulty by using condensates of aromatic diamines and alkyl-substituted or alkoxy-substituted dicarboxylic acids for producing shaped products. However, the softening points of these products are below 300°C and consequently their heat-resistance and flame-resistance are unsatisfactory (British Patent No. 1,135,462).

It is, however, of the greatest importance to be able to product heat-resistant polymers which also have excellent solubility properties and flame-resistance.

Surprisingly self-extinguishing aromatic polyamides having the repeating structural unit

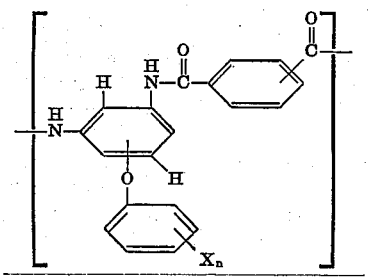

in which X represents halogen and n is an integer of from 0 to 2,
are obtained by polycondensation of equivalent quantities of
1. amino components consisting of
  a. 0 – 80 mol percent of 2,4-diaminodiphenyl ether
  b. 100 – 20 mol percent of a substituted 2,4-diaminodiphenyl ether with at least one halogen atom and
2. of acid components consisting of
  c. 20 – 100 mol percent of isophthalic acid dichloride or -dibromide and
  d. 80 – 0 mol percent of terephthalic acid dichloride or -dibromide.

These polyamides which have a relative solution viscosity of at least 2 (determined on a 1 percent solution of the polyamide in dimethylacetamide at 25°C) have all the required properties such as heat-resistance, excellent solubility and flame-resistance.

The halogenated amino component of the general formula

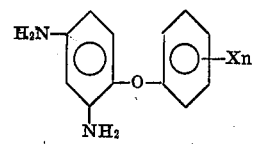

in which X represents a halogen atom, preferably chlorine or bromine, and $n = 1$ or 2, is obtainable in known manner by reacting 2,4-dinitrochlorobenzene with a phenol, e.g. p-chlorophenol in the presence of sodium hydroxide solution, using alcohol as solvent, and the resulting 2,4-dinitro-diphenyl ether, e.g. 2,4-dinitro-4'-chlorodiphenyl ether is reduced to the amino compound in known manner. This method of preparation is used both for the halogenated amino component and for the amino component which is not halogenated.

Preferably 4'-chloro-2,4-diaminodiphenyl ether, 2',4'-dichloro-2,4-diaminodiphenyl ether, 2'-chloro-2,4-diaminodiphenyl ether, 4'-bromo-2,4-diaminodiphenyl ether, 2'-bromo-2,4-diaminodiphenyl ether, 2',4'-dibromo-2,4-diaminodiphenyl ether are used.

Preferred polyamides are obtained from
1. 4'-chloro-2,4-diaminodiphenyl ether and isophthalic acid dichloride
2. 4'-chloro-2,4-diaminodiphenyl ether and isophthalic acid dichloride and terephthalic acid dichloride in a molar ratio of 100 : 0 to 40 : 60
3. 4'-chloro-2,4-diaminodiphenyl ether and 2,4-diaminodiphenyl ether in a molar ratio of 100 : 0 to 40 : 60 and isophthalic acid dichloride.

The polyamides of this invention are soluble in high polar solvents such as N-methyl pyrrolidone, dimethylformamide or dimethylacetamide, without the addition of salts so that the polymers can easily be worked up into transparent shaped products. They are distinguished by high softening points, which are above 300°C, as well as by high freezing temperatures and resistance to high temperatures. The polyamides are resistant to many organic solvents, e.g. alcohols, ethers, esters, aliphatic and aromatic hydrocarbons and ketones.

The polyamides are also distinguished by their high flame-resistance which is much higher than that of other soluble polyamides. They are non-combustible and self-extinguishing according to ASTM – D 568 – 61, whereas polyamides prepared from 4-ethoxy-1,3-diaminobenzene and isophthalic acid dichloride, for example, or polyamides of 2,4-diaminotoluene and isophthalic acid dichloride are much inferior in their flame-resistance since they continue to burn after exposure to fire.

Preparation of the polymers is carried out by the known process of solution polycondensation described in U.S. Pat. No. 3,063,966 by reacting equivalent quantities of the amino components with the diacid halide components at temperatures below 100°C and preferably at temperatures below 30°C in a solvent such as dimethylformamide, dimethylacetamide or N-methyl pyrrolidone. The solvent is sufficiently alkaline to bind the hydrogen halide formed during polycondensation, but additional acid acceptors such as tertiary amines or alkali metal or alkaline earth metal compounds such as carbonates or oxides may be added to neutralise the hydrogen halide.

Auxiliary agents such as stabilisers, UV-absorbers or additives such as pigments, fillers or dyes can be added to the polyamides. They are useful for the manufacture of foils, threads or fibres which can be made up into textiles, for example for the manufacture of protective clothing or technical products such as filter cloths which are intended for use at high temperatures.

EXAMPLE 1

406.9 g (1.734 mol) of 4'-chloro-2,4- diaminodiphenyl ether are dissolved in 1.54 litres of anhydrous dimethylacetamide in a three-necked flask equipped with stirrer, dropping funnel and gas inlet tube. 352.0 g (1.734 mol) of melted isophthalic acid dichloride are added dropwise over a period of 35 minutes, with stirring, in a nitrogen atmosphere, while the temperature is kept at 0° – 5°C. After the addition of the acid chloride at 0° – 5°C for ½ hour and at 25°C for 2½ hours the highly viscous reaction mixture is diluted with dimethylformamide. The polyamide is then precipitated by the addition of methanol and water under vigorous stirring, washed free from chloride ions and dried in a vacuum at 100°C. The polyamide obtained in a quantitative yield is a colourless powder which begins to soften at about 370°C. The polymer has a relative solution viscosity of 3.84 determined on a 1 percent solution of the polyamide in dimethylacetamide at 25°C in an Ubbelohde viscosimeter.

A colourless, transparent film is casted from an approximately 25 percent solution of the polyamide in dimethylformamide. The following data were obtained when the film was tested by the tensile test according to DIN 53 371:

| | |
|---|---|
| Yield stress | 1053 kg/cm² |
| Ultimate tensile strength | 990 kg/cm² |
| Elongation at breaking strain | 11 % |
| Elastic modulus | 36.300 kg/cm² |

In the flame-proof test according to ASTM – D 568 – 61, the test samples extinguished before reaching the measuring mark and do not continue to burn after removal of the flame.

EXAMPLE 2

330 g (1.406 mol) of 4'-chloro-2,4-diaminodiphenyl ether are dissolved in 1.44 litres of N-methyl pyrrolidone. 285.5 g (1.406 mol) of isophthalic acid dichloride are added dropwise under stirring over a period of 30 minutes at 0° – 5°C in a nitrogen atmosphere, stirring is continued for ½ hour at 0° – 5°C and then at 25°C. After about 12 hours, the procuts is treated as described in Example 1. The polyamide obtained starts to soften at 370°C, has a relative solution viscosity of 3.44 (determined as in Example 1) and is self-extinguishing according to the flame-proof test mentioned above. Fibres were produced from an approximately 28 percent solution of the polyamide in dimethylacetamide by the dry spinning process and stretched in the ratio of 1 : 2,2 in boiling water. The mechanical properties of the fibres were tested and the following data were obtained:

| | |
|---|---|
| Strength: | 1.7–1.8 g/dtex |
| Elongation: | 10–13 % |

The fibres withstood the flame-proof test according to DIN 53 906. The flame on the fibres extinguished immediately on removal of the igniting flame.

EXAMPLE 3

48.60 g (0.2071 mol) of 4'-chloro-2,4-diaminodiphenyl ether are dissolved in 184 ml of dimethylacetamide. A mixture of 21.02 g (0.1035 mol) of isophthalic acid dichloride and 21.02 g of terephthalic acid dichloride is added dropwise to this solution under stirring over a period of 15 minutes at 0° – 5°C in a nitrogen atmosphere. The reaction mixture is then stirred for 30 minutes at 0° – 5°C and then at 25°C for 3 hours. The reaction mixture is then treated as described in Example 1. A colourless polyamide is obtained which has a relative solution viscosity of 2.58. Its freezing temperature determined by differential thermo-analysis if 240° – 241°C.

Colourless, transparent films are casted from an approximately 25 percent solution of the polyamide in dimethylformamide. When the films were tested by the tensile test according to DIN 53 371, the following data were obtained:

| | |
|---|---|
| Yield stress | 919 kg/cm² |
| Ultimate tensile strength | 989 kg/cm² |
| Elongation at breaking strain | 25 % |
| Elastic modulus | 32.200 kg/cm² |

In the flame test carried out according to ASTM – D–568 – 61, the products extinguish before reaching the measuring mark and do not continue to burn after removal of the igniting flame.

EXAMPLE 4

33.16 g (0.1633 mol) of isophthalic acid dichloride are added to a solution of 25.10 g (0.1225 mol) of 2,4-diaminodiphenyl ether and 14.61 g (0.04083 mol) of 2',4'-dibromo-2,4-diaminodiphenyl ether in 148 ml of dimethylacetamide under stirring over a period of 15 minutes at 0° – 5°C in a nitrogen atmosphere. The reaction mixture is then kept at 0° – 5°C for 30 minutes and at 25°C for 3 hours. The polyamide isolated as described in Example 1 is a colourless product which has a relative solution viscosity of 2. The freezing temperature determined by differential thermo-analysis is 223° – 225°C. Films produced from this material are flame-resistant. They extinguish immediately after removal of the igniting flame.

We claim:
1. Self-extinguishing aromatic polyamides having the repeating structural unit of the general formula

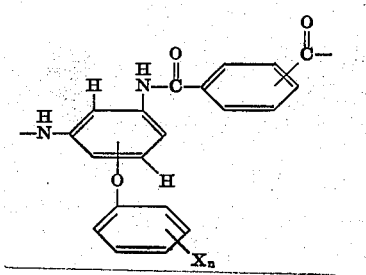

in which X represents halogen and $n$ is an integer of from 0 to 2, which polyamides have a relative solution viscosity of at least 2 when measured in a 1 percent solution of polyamide in dimethylacetamide at 25°C; and which are obtained by polycondensation of equivalent quantities of
1. amino components consisting of
   a. 0–80 mol percent of 2,4-diaminodiphenyl ether and
   b. 100–20 mol percent of a substituted 2,4-diaminodiphenyl ether with at least one halogen atom and
2. of acid components consisting of
   c. 20 – 100 mol percent of isophthalic acid dichloride or -dibromide and
   d. 80 – 0 mol percent of terephthalic acid dichloride or -dibromide.

2. The polyamide of claim 1 wherein said polycondensation is conducted at temperatures below 100°C in a solvent sufficiently alkaline to bind liberated hydrogen halide.

3. A shaped structure selected from the group consisting of foils, films, threads, and fibers produced from the polyamides of claim 1.

4. Foils consisting essentially of polyamides as claimed in claim 3.

5. Films consisting essentially of polyamides as claimed in claim 3.

6. Threads consisting essentially of polyamides as claimed in claim 3.

7. Fibres consisting essentially of polyamides as claimed in claim 3.

* * * * *